Figure 1:
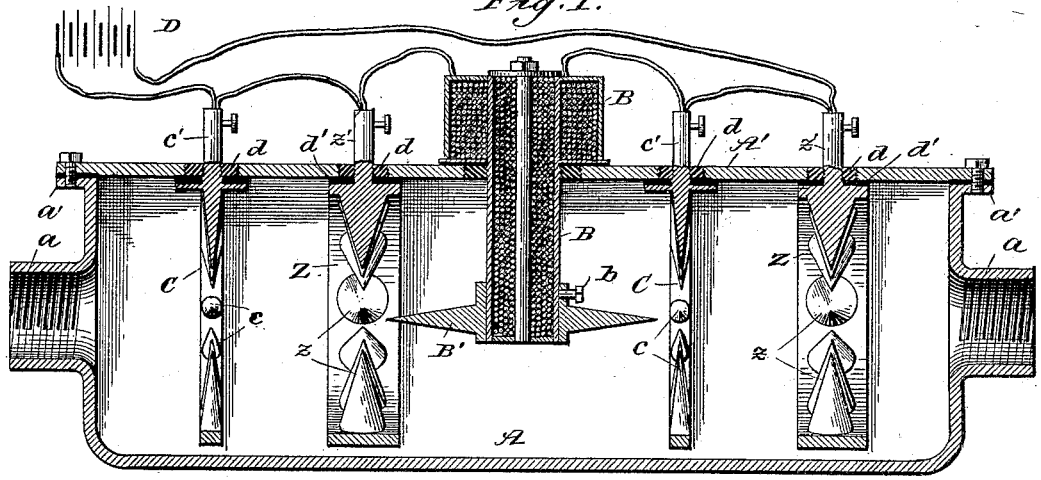

(No Model.)

A. B. FAUNCE & S. G. CABELL.
ELECTRIC MEANS FOR PREVENTING BOILER INCRUSTATION.

No. 438,579.　　　　　　　　　　　Patented Oct. 14, 1890.

Witnesses
Edwin L. Bradford
G. M. Copenhaver

Inventors
Albert B. Faunce and
Samuel G. Cabell
By their Attorneys,
V. D. Stockbridge & Son.

UNITED STATES PATENT OFFICE.

ALBERT B. FAUNCE, OF QUINCY, ILLINOIS, AND SAMUEL G. CABELL, OF WASHINGTON, DISTRICT OF COLUMBIA, ASSIGNORS OF ONE-THIRD TO MILTON S. CABELL, OF QUINCY, ILLINOIS.

ELECTRIC MEANS FOR PREVENTING BOILER INCRUSTATION.

SPECIFICATION forming part of Letters Patent No. 438,579, dated October 14, 1890.

Application filed June 7, 1890. Serial No. 354,595. (No model.)

*To all whom it may concern:*

Be it known that we, ALBERT B. FAUNCE and SAMUEL G. CABELL, citizens of the United States, residing, respectively, at Quincy, in the county of Adams and State of Illinois, and Washington, in the District of Columbia, have invented certain new and useful Improvements in Means for Preventing Incrustation in Steam-Boilers; and we hereby declare that the following is a full, clear, and exact description of the invention, such as will enable others skilled in the art to which it appertains to make and use the same.

This invention relates to improvements in means for preventing incrustation in steam-boilers, and belongs to that class wherein the feed-water and its impurities are subjected to galvanic and magnetic influences, or either of them, in its passage to and before it reaches the boiler.

The object of the invention is to secure a maximum of efficiency in a convenient and economical manner.

It is well known that galvanic and magnetic influences upon water and its impurities have the effect of removing scale already formed in boilers, and of preventing the formation of the same when applied within the boiler below the water-line, and that galvanic influences upon the water before introduction to the boiler have a similar effect. It is also true that the introduction to a boiler of negative and positive elements to produce galvanic action is objectionable, because the material of the boiler is liable to be corroded or consumed, and thus the boiler is destroyed. Furthermore, it is true that the introduction of an electro-magnet to a boiler below the water-line begets practical difficulties, among which is the necessity of inclosing the magnet in a water and steam tight case, and the impairment of the insulation of the magnetic helix by the heat and by the penetration of water in case the joints of the casing are imperfect, and repairs thereof can only take place by cooling off the boiler and removing the magnet.

Our invention, relating to the treatment of the water before it enters the boiler, is designed to obviate these difficulties, as well as to secure other advantages of economy and convenience.

The invention consists in the combination of a feed-water conduit, a negative and a positive electrode of any suitable metals, material, or composition which will induce galvanic action, insulated from the body of the conduit and out of contact with each other, and wires or other means of coupling said electrodes outside the conduit or vessel, whereby said negative and positive elements may be coupled for use or uncoupled, and thus save the consumption or destruction of said elements when not required for use.

It also consists in the combination, with negative and positive elements, arranged as above indicated, of an electro-magnet arranged so that the current of electricity from one pole to another may be made to pass through the magnetic helix, which thus is made to serve as a resistance-coil to retard consumption of the elements of the battery and at the same time to energize the magnet.

It also consists in the combination, with the foregoing elements, of an independent generator of electricity.

It also consists in certain details of construction and combinations involved in the apparatus we have devised for carrying out the inventions above stated.

Figure 2:
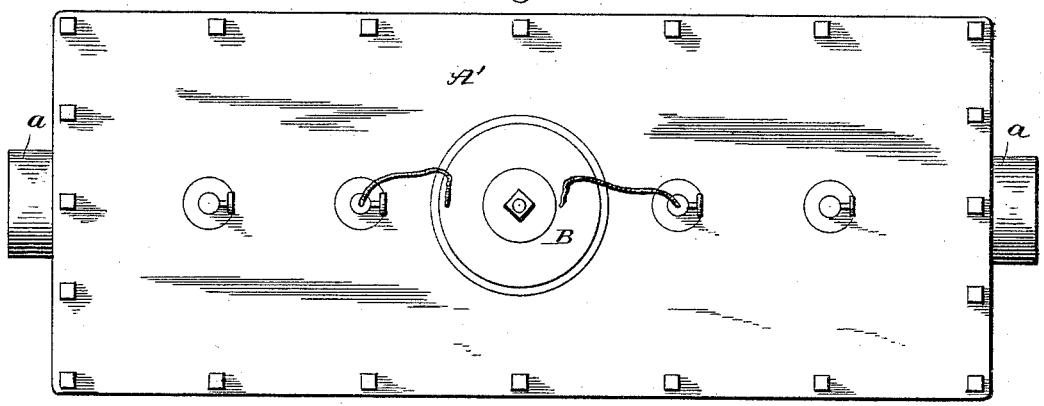
Figure 3:
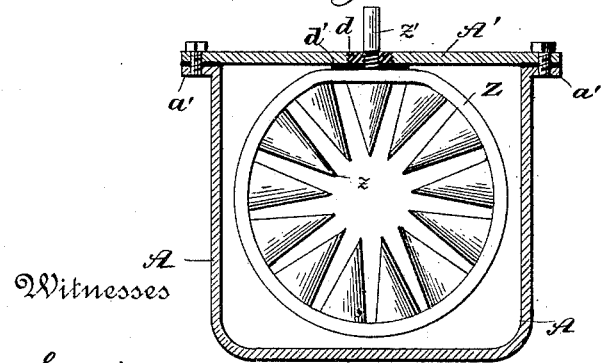
Figure 4:
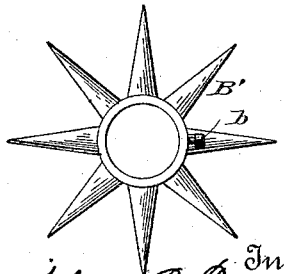

In the accompanying drawings, Figure 1 is a central section of a gland or vessel to be interposed as a part of the water-conduit from a feed-water heater to a boiler. Fig. 2 is a plan view of the same. Fig. 3 is a cross-section showing a zinc or copper ring in elevation. Fig. 4 is a plan of a polarized steel star-shaped body.

A is a gland or vessel, preferably of cast-iron, of any desired shape and dimensions. This gland is provided with bosses $a\ a$ for connection with the feed-pipe and with flanges $a'\ a'$, through which by means of suitable bolts the lid or cover A' is secured in place. The parts A and A' are fitted together to make a tight joint, and for greater security packing may be interposed between them.

B is an incased electro-magnet adjusted in the lid, as shown, and to the bottom of this magnet is secured a permanently-magnetized star-shaped body B'. This body has a hub or sleeve to embrace the electro-magnet, and is secured by means of a set-screw $b$ or otherwise, as may be most convenient.

C is a copper ring or loop having inwardly-projecting points $c$, as shown, and Z is a zinc ring having points $z$ similar to those on the copper ring.

D is an independent generator of electricity, having leading-in and leading-out wires or coupling devices. The copper and the zinc rings are provided with stems or studs $c'$ and $z'$, respectively, and these extend through insulating-buttons $d\ d$ to the upper or outside of the lid or cover. The joints between the insulators, the lid, and the stems are protected and the whole made tight by insulating and packing gaskets $d'\ d'$. Each stem is constituted a binding-post for wire connections, so that the electrodes may be coupled together or uncoupled or may be coupled with the magnetic helix of magnet B or with an independent source of electricity. These elements may be coupled in various ways—in series, multiple, &c.—and their normal energy may be augmented by a current from an independent electrical generator, as D.

We have referred throughout the specification to the invention as being arranged in the feed-water conduit, while by preference we place the device between the heater and the boiler; but its arrangement anywhere between the source of supply and the boiler, as in the feed-water tank, the heater, the supply-pipe, or the mud-drum, will bring it within the scope of our invention. It is remarked that a circuit-breaker may be interposed between the electrical generator and any of the parts to be coupled therewith, if desired, and also that the positive element may be inclosed in porous cups, if found expedient, without departing from our invention.

Obviously the form and dimensions of the gland, the form and dimensions of the positive and of the negative elements, and the construction of the magnet and the independent generator may be varied indefinitely without departing from our invention, the principle to be observed being that the positive and negative elements be out of contact with each other and insulated from the body of the gland to be coupled at will outside the gland or vessel with each other or the magnetic helix or independent generator.

With certain waters, the boiler being clean, the influence of the permanent magnet will be sufficient to prevent the formation of scale. With other waters the combined influence of a magnet and the relatively feeble influence of the galvanic action, weakened by passing the current through a coil, will be sufficient, and with other waters the influence of galvanic action of all the electrodes coupled together may be required. In some cases we may couple the electrodes or the magnet, or all, with an outside source of electricity, and thus augment the influence of both or either to a maximum degree; but this will rarely be required.

This apparatus is simple and is cheaply made and affords means whereby just the required force or influence to produce the result desired and the corresponding consumption or exhaustion of the electrodes may be regulated at will.

Having now described our invention, what we claim is—

1. The combination of a feed-water conduit, a negative and a positive electrode out of contact with each other and insulated from the body of the conduit, and means for coupling and uncoupling said electrodes outside the conduit, substantially as described.

2. The combination of a feed-water conduit, a negative and a positive electrode out of contact with each other, insulated from the conduit, means for coupling and uncoupling said electrodes outside said conduit, and an interposed magnetic helix, substantially as described.

3. The combination of a feed-water conduit, a negative and a positive element out of contact with each other and insulated from the conduit, an independent electrical generator, and means for coupling said elements with said generator, substantially as described.

4. The combination of a feed-water conduit, a negative and a positive element out of contact with each other and insulated from the conduit, a magnetic helix, an independent electrical generator, and means for coupling the electrodes and helix with said generator, substantially as described.

In testimony whereof we affix our signatures in the presence of witnesses.

ALBERT B. FAUNCE.
    SAMUEL G. CABELL.

Witnesses to the signature of Albert B. Faunce:
 HENRY SOEBBING,
 FRANK SOEBBING.

Witnesses to the signature of Samuel G. Cabell:
 WM. M. STOCKBRIDGE,
 EDWIN L. BRADFORD.